United States Patent [19]

Deyer

[11] Patent Number: 4,513,394
[45] Date of Patent: Apr. 23, 1985

[54] SYSTEM FOR PROVIDING A MULTI-BIT INPUT TO A COMPUTER CONTROLLED SYSTEM

[75] Inventor: Craig E. Deyer, Akron, Pa.

[73] Assignee: RCA Corporation, New York, N.Y.

[21] Appl. No.: 402,545

[22] Filed: Jul. 28, 1982

[51] Int. Cl.³ .............................................. G06F 3/02
[52] U.S. Cl. ............................... 364/900; 340/365 S; 340/365 R
[58] Field of Search ............................ 364/200, 900; 340/365 S, 365 R

[56] References Cited

U.S. PATENT DOCUMENTS

| | | | |
|---|---|---|---|
| 4,282,516 | 8/1981 | Tults | 340/365 S |
| 4,310,720 | 1/1982 | Check, Jr. | 178/22.08 |
| 4,321,695 | 3/1982 | Redwine et al. | 365/174 |
| 4,346,369 | 8/1982 | Macy | 340/365 S |
| 4,405,978 | 9/1983 | Lange et al. | 364/200 |
| 4,443,789 | 4/1984 | Endfield et al. | 340/365 R |

*Primary Examiner*—Eddie P. Chan
*Attorney, Agent, or Firm*—Eugene M. Whitacre; Lester L. Hallacher; Thomas H. Magee

[57] ABSTRACT

A system for inputting a multi-bit input to a computer in response to the closing of a single switch includes a multi-line to a single line encoder. A plurality of input switches individually set different input position numbers into the encoder. When the input from a binary counter equals the number, the number is output to the computer.

10 Claims, 2 Drawing Figures

SYSTEM FOR PROVIDING A MULTI-BIT INPUT TO A COMPUTER CONTROLLED SYSTEM

BACKGROUND OF THE INVENTION

This invention relates generally to computer controlled systems and particularly to a system for providing a multi-bit input to the computer of such a system by depressing a single key on a keyboard.

Frequently with a computer controlled system, a keypad is used to provide input information to the computer. A single key is pressed to provide a multi-bit (typically 16 bit) input to the computer. An example of such a computer controlled system is a 3-in-1 lighthouse which is used to apply the black matrix to the inside surface of the faceplate panel of a color kinescope. In such a lighthouse, the panel and lensing/lighting system of the lighthouse are moved relative to one another to three different positions. At each position, a light is flashed to expose a photosensitive binder including the black matrix material through the apertures of a shadow mask which is mounted in the panel. Three positions are used because exposures are required at the three positions where the three colors of phosphors are subsequently applied to the panel. Accordingly, such a control system must be provided with an input that identifies the parameter and an additional input which establishes the value of the parameter. For example, the excursion distance the panel and lensing/lighting system move relative to one another requires that two inputs be supplied to the computer. The first input identifies the input as the excursion distance and requires pressing a particular key on the keypad. The second input sets the actual distance traveled and requires pressing a different key. Accordingly, every parameter supplied to the system requires a first multi-bit input to identify the parameter and a second multi-bit input to establish the value of the parameter.

The instant invention fulfills these requirements by the provision of a system for inputting multi-bit inputs to a computer by the depression of a single key on a keyboard pad.

CROSS REFERENCES TO RELATED PATENT APPLICATIONS

The following patent applications, filed of even date herewith by Craig E. Deyer, describe systems which can be used in a computer controlled system employing the instant invention.

Application Ser. No. 402,546 entitled "Switch Arrangement For Accessing A Computer".

Application Ser. No. 402,544 entitled "System For Inputting A Selected One Of A Plurality Of Inputs To A Computer".

Application Ser. No. 402,428 entitled "System For Converting The Frequency Of A Pulse Train To A Binary Number".

Application Ser. No. 402,426 entitled "System For Inputting A Security Code To A Computer".

Application Ser. No. 267,750 now U.S. Pat. No. 4,436,394 entitled "System And Method For Controlling The Exposure Of Color Picture Tube Phosphor Screens", and Application Ser. No. 267,991 now U.S. Pat. No. 4,370,036 entitled "System And Method For Intermittently Moving A Picture Tube Panel On A Lighthouse", and Application Ser. No. 267,749 now U.S. Pat. No. 4,416,521 entitled "System And Method For Determining The Light Transmission Characteristics Of Color Picture Tube Shadow Masks", all filed on May 28, 1981 by W. R. Kelly and E. J. Alvero describe a lighthouse control system which can receive access commands from the instant invention.

SUMMARY OF THE INVENTION

A system for providing a multi-bit input to a computer in response to the change of state of one of a plurality of system input lines includes input logic having a plurality of input terminals, a plurality of binary number terminals and at least one output terminal. The input terminals are used to set a multi-bit number into the input logic. Binary numbers are provided to the input logic to produce an output on the output terminal when the binary number equals the multi-bit number. Bistable logic is arranged between the input logic and a clock to control the clock. Output logic is responsive to the binary number and is controlled by the bistable logic to provide the multi-bit number to the computer when the binary number equals the multi-bit number.

DETAILED DESCRIPTION OF THE PREFERRED EMBODIMENT

Figure 1:
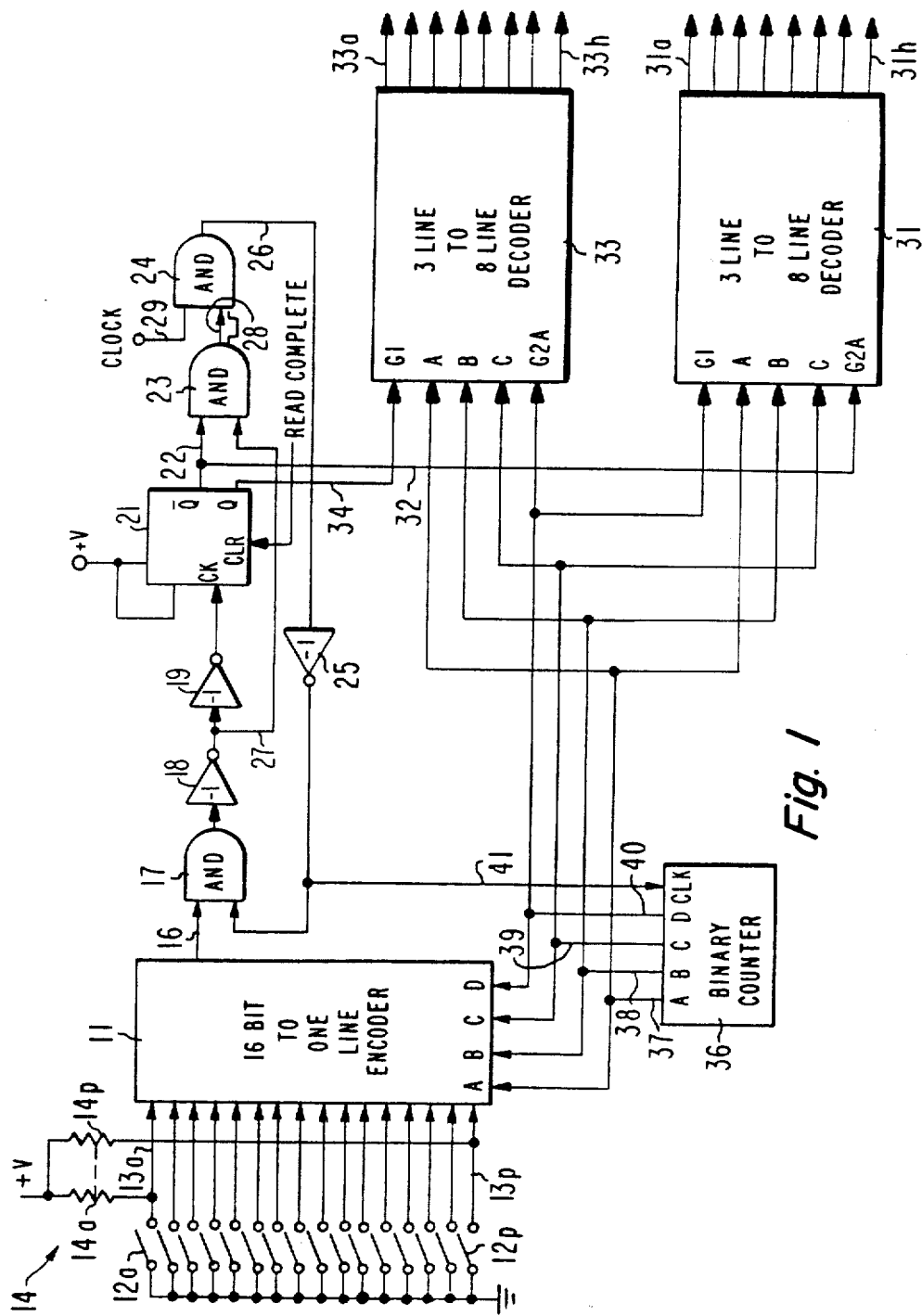
FIG. 1 is a block diagram of a system for inputting a multi-bit parameter identification to a computer controlled system.

In FIG. 1, the inventive system 10 includes an input logic circuit 11 in the form of a 16 bit to one-line encoder. This type of logic circuit is available commercially and, for example, can be an SN74150 encoder available from Texas Instrument Corporation. A plurality of switches, 12a–12p represent the keys of a keypad used to provide inputs to the encoder 11 over a plurality of input lines 13a–13p. A resistance network 14 including a plurality of resistors, only two of which 14a and 14b are shown for simplicity, biases the input lines 13a–13p to a normally high state. When one of the keys 12a–12p is closed, the normally high input line associated with the closed switch goes low because of the connection of the switches to ground. An output line 16 of the encoder 11 is normally low and goes high when any one of the switches 12a–12p is closed and the count from a binary counter 36 corresponds to the input position value of the closed switch.

The output line 16 of the encoder 11 provides an input pulse to bistable logic including an AND GATE 17, an inverter 18, an inverter 19, and a D-type flip-flop 21. The $\overline{Q}$ output of the flip-flop 21 is coupled by a line 22 to a clocking circuit consisting of two AND Gates 23 and 24. The output of the AND Gate 24 is coupled by a line 26 to an input terminal of the AND Gate 17 through an inverter 25 and a line 26a. The junction of the inverters 18 and 19 is coupled by a line 27 to the second input terminal of the AND Gate 23. The input terminals of the AND Gate 24 are coupled to the output of the AND Gate 23 by the line 28 and to the system clock by the line 29. A 3-line to 8-line decoder 31 receives an input pulse on the G2A input terminal from the $\overline{Q}$ output terminal of the flip-flop 21 by way of a line 32. An identical 3-line to 8-line decoder 33 receives an input pulse on the G1 input terminal from the Q output terminal of the flip-flop 21 by way of a line 34. The decoder 31 has output terminals 31a to 31h and the decoder 33 has output terminals 33a to 33h. The decoders 31 and 33 are commercially available and, for example, can be SN74LS138 Texas Instruments decoders.

A binary counter 36 provides output pulses on A, B, C, and D output terminals by way of lines 37, 38, 39 and 40, respectively. Lines 37-40 are connected to input terminals A, B, C and D of the encoder 11 and to similarly identified A, B and C input terminals of the decoders 31 and 33. The binary counter 36 receives the clock pulses available on the line 26 by way of a line 41.

In operation, the switches 12a-12p are normally open and the input lines 13a-13p are biased high by the resistance network 14. The output line 16 of the encoder 11, therefore, is normally low and, the output of the AND Gate 17 is low. The $\overline{Q}$ output terminal of the flip-flop 21, therefore, is normally high. The output terminal of the inverter 18 is high and the AND Gate 23 is enabled by the highs on the lines 22 and 27. Accordingly, the output line 28 of the AND Gate 23 is normally high. The clock pulses coming into the AND Gate 24 from the clock line 29 pass through the AND Gate 24 to the line 26 to apply the clock pulses to the inverter 25. The compliment of the pulse train is applied by the line 26a to the AND Gate 17 and to the binary counter 36. The binary counter 36 counts up and provides binary numbers over output lines 37-40 to the encoder 11 and the decoders 31 and 33. The clock pulses do not pass through the AND Gate 17 because of the low on line 16. When one of the switches 12a-12p is closed, an input position number which identifies a particular parameter is set into the encoder 11. For example, switch 12a can be used to set in the input chosen to identify the excursion distance. After one of the switches 12a-12p is closed and an input position number is set into the encoder 11, the binary counter 36 continues to count as the clock pulses are received from the AND Gate 24. When the binary output of the counter 36 matches the input position number set into the encoder 11 by the closing of one of the switches 13a-13p the selected input is passed to the output line 16. The output line 16 goes from low to high and enables the AND Gate 17. With the AND Gate 17 enabled, the output of the inverter 19 goes from low to high and triggers the flip-flop 21. The $\overline{Q}$ output terminal of the flip-flop 21 goes from high to low and disenables the AND Gate 23. The output line 28 of the AND Gate 23 also goes low disenabling the AND Gate 24 and turning off the flow of clock pulses to the AND Gate 17 and the binary counter 36.

The decoder 31 receives the $\overline{Q}$ output of the flip-flop 21 from the line 32 on the G2A input terminal and, therefore, this decoder is enabled on a low input. The decoder 33 receives the Q output of the flip-flop 21 from the line 34 on the G1 input. This decoder, therefore, is enabled on a high. When the AND Gate 17 is enabled by the high on the line 16, the $\overline{Q}$ output of the flip-flop 21 goes from high to low and the Q output goes from low to high. Accordingly, the decoders 31 and 33 are simultaneously enabled and the binary number set into the decoders by the binary counter during clocking is available on the output terminals 33a-33h and 31a-31h. Accordingly, the 1 of 16-bit input number set into the encoder 11 by the closing of one of the switch 12a-12p is available as a 1 of 16-bit output at leads 31a-31h and 33a-33h. Typically, the 0 to 7 bits are on the lines 33a-33h and the 8 to 15 bits are on the lines 31a-31h.

When the flip-flop 21 is reset by a read complete pulse from the computer, the $\overline{Q}$ bar output returns to high and the Q output returns to low. The AND Gate 23 is again enabled and the output returns to high to enable the AND Gate 24, and clock pulses are again applied to the binary counter 36 which resumes counting. It should be noted that if one of the switches 12a-12p remains closed when the flip-flop 21 is reset, line 16 remains high and clocking can not resume until the closed switch is opened. The 1 of 16-bit number available on the output leads 31a-31h and 33a-33h identifies to the computer the particular parameter, such as the excursion distance for which actual values will next be entered.

Figure 2:
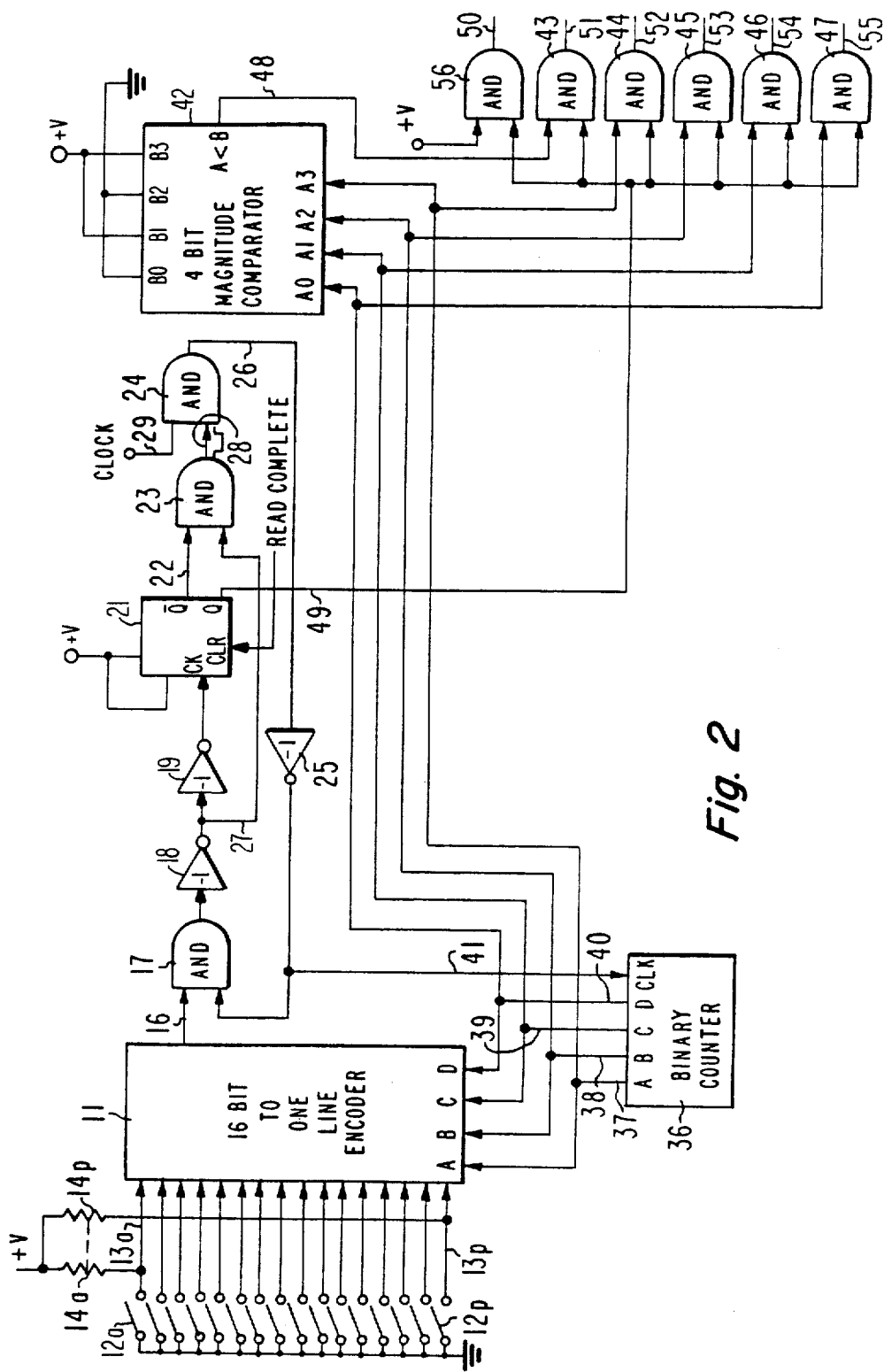
FIG. 2 is a block diagram of a system for inputting a multi-bit parameter value to a computer controlled system.

FIG. 2 is a block diagram of a preferred embodiment of a system for setting the actual parameter values into the computer. In FIG. 2, the encoder 11, the AND Gate 17, the flip-flop 21, the clocking AND Gates 23 and 24, and the binary counter 36 are arranged identically to the similarily numbered elements of FIG. 1. The FIG. 1 output logic consisting of the decoders 31 and 33 is replaced by a four-bit magnitude comparator 42. The binary number outputs of the counter 36 available on the output lines 37-40 are individually coupled to one input terminal of a plurality of AND Gates 44-47. An AND Gate 43 has one input terminal coupled to an A<B output terminal of the magnitude comparator 42 by a line 48, and an AND Gate 56 has one input terminal coupled to a constant +V bias voltage. The other input terminals of the AND Gates 43-47, 56 are coupled to the normally low Q output of the flip-flop 21 by the line 49.

The output lines 50-55 of the AND Gates 43-47, 56, therefore, are normally low. The binary number outputs of the counter 36 are applied to the AND Gates 44-47, but do not change the output lines 52-55 because of the low on the other input terminal. The operator sets a parameter value into the system by closing one of the switches 12a-12p selected to identify that value. For example, one of the switches can identify an excursion distance of one inch (2.54 cm). Upon closing, this switch sets an input to the encoder which identifies the one inch excursion. When the AND Gates 44-47 are enabled, the binary number is available on the output lines 52-55.

The enabling of the AND Gates 43-47, 56 is the same as the FIG. 1 embodiment. When the binary output of the counter 36 matches the input set into the encoder 11 by one of the switches 12a-12p, the output line 16 goes high and triggers the flip-flop 21 and turns off the clocking gates 23 and 24. When the flip-flop 21 triggers, the Q output terminal goes high and enables the AND Gates 43-47, 56.

The output of the counter 36 is a four-bit binary number and the computer typically is arranged to receive ASCII. The system of FIG. 2 also has the advantage of converting the binary numbers to ASCII characters. Table I below is a portion of the standard HEX-ASCII conversion table with the hexadecimal 30-39 series and 2a-2f reversed. Table I shows that the low order nibble of the hexadecimal numbers and the ASCII characters follows the counter output sequence exactly. The high nibble of the first ten hexadecimal numbers is 3 and becomes 2 above 10. Accordingly, by changing the high order nibble when the output of the counter 36 exceeds 10, the conversion from hexadecimal to ASCII is accomplished. The four-bit comparator 42 receives the counter 36 output on the A0 to A3 input terminals. The B0 to B3 input terminals are hardwired for 10. When the number input to the A0 to A3 is less than the 10 hardwired into the B-0 to B-3 terminals, the A<B output terminal of the comparator 42 is high and the high nibble of the number is the 3. When the number input to the A0–A3 terminals is equal to or greater than the 10 wired to B0–B3 terminals, the A<B output terminal goes low and changes the high nibble 3 to a 2. The high nibble is output through AND Gates 56 and 43 over output lines 50 and 51. The low nibble is output through AND Gates 44 to 47 over lines 52 to 55.

TABLE I

| Key Pressed | Ascii Character | Hex. | Counter 36 Output |
|---|---|---|---|
| 0 | 0 | 30 | 0000 |
| 1 | 1 | 31 | 0001 |
| 2 | 2 | 32 | 0010 |
| 3 | 3 | 33 | 0011 |
| 4 | 4 | 34 | 0100 |
| 5 | 5 | 35 | 0101 |
| 6 | 6 | 36 | 0110 |
| 7 | 7 | 37 | 0111 |
| 8 | 8 | 38 | 1000 |
| 9 | 9 | 39 | 1001 |
| N.C. | * | 2A | 1010 |
| + | + | 2B | 1011 |
| ENTER | , | 2C | 1100 |
| − | − | 2D | 1101 |
| . | . | 2E | 1110 |
| N.C. | / | 2F | 1111 |

I claim:

1. A system for providing a multi-bit input to a computer in response to the change of state of one of a plurality of system input lines comprising:
   input logic means having a plurality of input terminals, a plurality of binary number terminals and at least one output terminal;
   a plurality of means for changing the state of said input terminals, each of said input terminals being responsive to one of said means for changing state whereby a change of state on one of said input terminals sets and input position number into said logic means;
   binary input means for providing binary inputs to said binary number terminals whereby said input logic means produces an output on said output terminal when said binary input equals said input position number;
   clock means for providing clock pulses to said binary input means;
   bistable logic means arranged between said input logic means and said clock means for receiving said output on said output terminal of said input logic means whereby said bistable logic means controls said clock means, said bistable logic means being responsively coupled to a read-complete signal from said computer; and
   output logic means responsive to said binary input means and controlled by said bistable logic means for decoding said binary inputs into said input position number whereby said multi-bit input is provided to said computer when via said output logic means said binary input equals said input position number.

2. The system of claim 1 wherein said input logic means is a multi-line to single-line encoder.

3. The system of claim 2 wherein said bistable logic means includes a D-type flip-flop responsive to said at least one output terminal.

4. The system of claim 3 wherein said bistable logic means further includes multi-input logic means conjunctively responsive to said output terminal and said clock means.

5. The system of claim 4 wherein said binary input means includes a binary counter.

6. The system of claim 3 wherein said clock means is responsive to said flip-flop and wherein said bistable logic means is responsive to said clock means whereby said clock means enables said bistable logic means.

7. The system of claim 6 wherein said clock means includes at least one logic means having conjunctively responsive multi-input terminals.

8. The system of claim 3 or 6 wherein said output logic means includes decoder means having a plurality of output terminals at least equal in number to said plurality of input terminals.

9. The system of claim 8 wherein said decoder means includes at least one three-line to eight-line decoder.

10. The system of claim 3 or 6 wherein said output logic means includes at least one multi-bit magnitude comparator.

* * * * *